US007911664B2

(12) United States Patent
Horaguchi et al.

(10) Patent No.: US 7,911,664 B2
(45) Date of Patent: Mar. 22, 2011

(54) IMAGE READER (75) Inventors: Yoichi Horaguchi, Tajimi (JP); Takashi Ohama, Iwakura (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 872 days.

(21) Appl. No.: 10/753,198

(22) Filed: Jan. 8, 2004

(65) Prior Publication Data

US 2004/0201872 A1    Oct. 14, 2004

(30) Foreign Application Priority Data

Jan. 8, 2003 (JP) ................................. 2003-002421

(51) Int. Cl.
*H04N 1/04* (2006.01)

(52) U.S. Cl. ........ 358/498; 358/474; 358/486; 358/488; 358/496; 358/497; 358/296; 358/512; 358/513; 358/514

(58) Field of Classification Search .................. 358/474, 358/486, 505, 514, 1.5, 515, 501, 509, 482–483, 358/488, 494, 496–498
See application file for complete search history.

(56) References Cited

U.S. PATENT DOCUMENTS

| | | | | |
|---|---|---|---|---|
| 4,891,690 A * | 1/1990 | Hasegawa et al. | ............ | 358/514 |
| 4,974,072 A * | 11/1990 | Hasegawa | ..................... | 358/514 |
| 5,150,227 A * | 9/1992 | Koshiyouji et al. | ........... | 358/497 |
| 5,477,345 A * | 12/1995 | Tse | ................................ | 358/500 |
| 5,481,381 A * | 1/1996 | Fujimoto | ....................... | 358/505 |
| 5,570,206 A * | 10/1996 | Yoshinaga | ..................... | 358/497 |
| 5,583,667 A * | 12/1996 | Yamada | ......................... | 358/529 |
| 5,673,124 A * | 9/1997 | Kaji et al. | ..................... | 358/474 |
| 5,734,758 A * | 3/1998 | Yamamoto et al. | .......... | 382/274 |
| 5,796,928 A * | 8/1998 | Toyomura et al. | ............ | 358/1.6 |
| 5,856,879 A * | 1/1999 | Suzuki et al. | ................. | 359/210 |
| 5,859,712 A * | 1/1999 | Kim | .............................. | 358/504 |
| 5,953,014 A * | 9/1999 | Wood | ............................ | 345/422 |
| 6,057,944 A * | 5/2000 | Takeuchi | ...................... | 358/468 |
| 6,236,471 B1 * | 5/2001 | Lee | .............................. | 358/474 |
| 6,333,795 B1 * | 12/2001 | Kaji | ............................. | 358/474 |
| 6,542,263 B2 * | 4/2003 | Emmenegger et al. | ....... | 358/498 |
| 6,646,768 B1 * | 11/2003 | Andersen et al. | ............ | 358/474 |
| 6,765,703 B1 * | 7/2004 | Watanabe | ..................... | 358/514 |

(Continued)

FOREIGN PATENT DOCUMENTS

JP        A-04-135375        5/1992

(Continued)

OTHER PUBLICATIONS

Japanese Patent Office Communication, dispatched Oct. 13, 2009 in Japanese Patent Application No. 2008-004030.

*Primary Examiner* — King Y Poon
*Assistant Examiner* — Richard Zhu
(74) *Attorney, Agent, or Firm* — Oliff & Berridge, PLC (57) ABSTRACT

If the user specifies a color mode, an image reader previously moves a read head to a position where a first read target position r and a read start position on an original are identical with each other. If the user specifies a monochrome mode, the image reader previously moves the read head to a position where a second read target position and the read start position on an original are identical with each other. After this, an image can be read from the same range without increasing the time required for image read processing.

17 Claims, 8 Drawing Sheets

U.S. PATENT DOCUMENTS

| | | | |
|---|---|---|---|
| 6,963,430 B2 * | 11/2005 | Matsui | 358/486 |
| 7,119,932 B2 | 10/2006 | Sato et al. | |
| 7,295,355 B2 * | 11/2007 | Tomaru | 358/505 |
| 7,450,279 B2 * | 11/2008 | Hiromatsu et al. | 358/505 |
| 7,471,426 B2 * | 12/2008 | Ide et al. | 358/474 |
| 2003/0053157 A1 * | 3/2003 | Sakakibara et al. | 358/514 |
| 2003/0081265 A1 * | 5/2003 | Watanabe | 358/474 |
| 2003/0214687 A1 | 11/2003 | Tomaru | |

FOREIGN PATENT DOCUMENTS

| | | |
|---|---|---|
| JP | A-07-030710 | 1/1995 |
| JP | A-07-273952 | 10/1995 |
| JP | A 8-202854 | 8/1996 |
| JP | A-09-139809 | 5/1997 |
| JP | A 9-205518 | 8/1997 |
| JP | A 10-224574 | 8/1998 |
| JP | A-11-164088 | 6/1999 |
| JP | A 11-331501 | 11/1999 |
| JP | A-11-341222 | 12/1999 |
| JP | A 2000-92292 | 3/2000 |
| JP | A-2000-216963 | 8/2000 |
| JP | A-2001-077990 | 3/2001 |
| JP | A 2001-144900 | 5/2001 |
| JP | A-2001-157001 | 6/2001 |
| JP | A-2001-197269 | 7/2001 |
| JP | B2 3230282 | 9/2001 |
| JP | A-2002-044437 | 2/2002 |
| JP | A 2002-111968 | 4/2002 |
| JP | A-2002-111982 | 4/2002 |
| JP | A-2002-135540 | 5/2002 |
| JP | A-2002-247290 | 8/2002 |
| JP | A-2002-314755 | 10/2002 |
| JP | A-2002-320077 | 10/2002 |
| JP | A-2004-056583 | 2/2004 |

* cited by examiner

FIG. 8

IMAGE READER

BACKGROUND OF THE INVENTION

1. Field of the Invention

This invention relates to an image reader.

2. Description of the Related Art

Hitherto, an image reader configured to read an image from an original by a linear image sensor including three image reading elements corresponding to R (red), G (green), and B (blue) has been known. This kind of image reader can read a color image from an original using the three image reading elements and can also read a monochrome image from an original using one image reading element (for example, corresponding to G (green)).

In recent years, an image reader configured to read an image from an original by a linear image sensor further includes one image reading element, which serves as an image reading element dedicated to reading of a monochrome image in addition to the three image reading elements has been known. (JP-A-2002-111968) This kind of image reader can read a color image from an original using the three image reading elements dedicated to reading of a color image and can also read a monochrome image from an original using one image reading element dedicated to reading of a monochrome image.

However, the image readers in the related arts involve the following problems:

In the image reader, a flatbed mechanism (FB) or an automatic document feeder (ADF) is used to read an image from an original. That is, either one of the image sensor and an original is moved relative to the other by the FB or the ADF for the image sensor to scan over the original in the range of a read start position to a read end position.

However, the three image reading elements used to read a color image and the one image reading element used to read a monochrome image (=one of the three image reading elements used to read a color image or one image reading element dedicated to reading of a monochrome image different from the three image reading elements used to read a color image) differ slightly in a read target position.

Thus, if the positional relationship between the image sensor and the original at the start time of a relative move, the timing of starting the relative move, which will be hereinafter referred to as the move start timing, and the timing of actually starting read processing of the original by the image sensor, which will be hereinafter referred to as the read start timing, for reading a color image are all matched with those for reading a monochrome image, the scan ranges over the original do not strictly match. As a result, the image in the same range cannot precisely be read; this is a problem.

As for the problem, if the read start timing is a little delayed for either one of the case where a color image is read and the case where a monochrome image is read, it might be possible to match the scan range over the original with that for the other.

In this case, however, the read start timing is a little delayed rather than the move start timing and thus the read termination timing is also delayed; there is a problem of somewhat increasing the time required from the move start timing to the read termination timing.

SUMMARY OF THE INVENTION

The invention was made to solve the above-mentioned problem. It is an object of the invention to provide an image reader that can read an image from the same range without increasing the time required for image read processing although an image sensor including a plurality of image reading elements, which read an image from different read target position between the case where a color image is read and the case where a monochrome image is read is used.

To the end, according to a first aspect of the invention, an image reader includes an image sensor, a relative move unit, a mode switch unit, and a control unit. The image sensor includes plural sets of color image reading elements and plural sets of monochrome image reading elements. The plural sets of color image reading elements read a part of an original, which is located at a first read target position of the image sensor, as a color image. The plural sets of monochrome image reading elements which read the part of the original, which is located at a second read target position of the image sensor different from the first read target position, as a monochrome image. The relative move unit moves one of the image sensor and the original relatively to the other of the image sensor and the original. The mode switch unit switches between a color mode and a monochrome mode in accordance with a user's instruction. When the mode switch unit switches to the color mode, the control units makes the first read target position and a read position, from which the image sensor starts reading the original, be identical with each other automatically. When the mode switch unit switches to the monochrome mode, the control units makes the second read target position and the read position be identical with each other automatically.

In the image reader, for example, a linear image sensor can be adopted as the image sensor. More specifically, an image sensor that can read an image of one line made up of a plurality of pixels as a one-dimensional array using CCD (charge-coupled device), etc., or the like can be used. However, if the image sensor is an image sensor with two lines in a staggered configuration for increasing the resolution and using the two lines as one read unit, no problem arises in the configuration.

The image sensor can read a color image and includes a plurality of image reading elements on which different color filters are put. As the different color filters, either RGB color filters generally used with a linear image sensor or YMC color filters as complementary colors to RGB may be used.

If the image sensor reads the original by the color image reading elements, the first read target position is used. On the other hand, if the image sensor reads the original by the monochrome image reading element group, the second read target position different from the first read target position is used.

The color image reading elements may be made up of a plurality of image reading elements different in the read target position and may read the original by the image reading elements while the same position on the original passes through a plurality of read target positions corresponding to the plurality of image reading elements subsequently when the relative move unit moves the image sensor and the original relatively (for example, a three-line image sensor having three image reading elements corresponding to R, G, and B placed in parallel, a four-line image sensor having the three image reading elements plus one image reading element dedicated to reading of a monochrome image, or the like). In this case, the read target position corresponding to one of the image reading elements reading a part of the original first becomes the first read target position.

For the three-line image sensor, one of the three lines is used to read a monochrome image. If the one line also used for a monochrome image and the one line for first reading an image in reading a color image are different, the first and second read target positions are used as described above.

As the color image reading elements, an inline color image reading element group having R, G, and B color filters arranged periodically is also known. Also in this case, if the two-line configuration with one image reading element dedicated to reading of a monochrome image added is adopted, the first and second read target positions are used as described above.

The relative move unit is a unit which moves either one of the image sensor and the original relatively to the other. An FB is known as a unit which moves the image sensor. An ADF is known as a unit which moves the original. The image reader may be provided with either or both of the FB and the ADF. If both of the FB and the ADF are provided, the configuration of the first aspect may also be adopted only for either of the FB and the ADF.

The mode switch unit is made up of an input unit operated by the user to enter a command (for example, an operation panel) and a setting unit for setting the operation mode conforming to the command entered by the user using the input unit (for example, CPU, memory, etc.,).

The control unit is a unit for controlling the operation of the components of the image reader; for example, it is implemented as a microcomputer.

According to the described image reader, if the mode switch unit switches to the color mode, the control units makes the first read target position and the read position be identical with each other automatically. Then, after another user's instruction for starting reading the original, the control unit repeats making the plural sets of monochrome image reading elements read the part of the original and making the relative move unit move the one relatively, to obtain a monochrome image corresponding to the original. On the other hand, when the mode switch unit switches to the color mode, the control units makes the second read target position and the read position be identical with each other automatically. Then, after another user's instruction for starting reading the original, the control unit repeats making the plural sets of color image reading elements read the part of the original and making the relative move unit move the one relatively, to obtain a color image corresponding to the original.

That is, the operation until the read position and the first read target position are matched with each other or the operation until the read position on the original and the second read target position are matched with each other is executed at the point in time when the mode switch unit switches the mode. Therefore, the operation does not cause the processing time to grow after the user enters an original read start command.

Then, if the user enters an original read start command, the relative positional relationship between the case where a color image is read and the case where a monochrome image is read is already different positional relationship. Thus, if the timing of starting a relative move from the position and the timing of starting actual original read processing in the image sensor are matched between the case where a color image is read and the case where a monochrome image is read, they match in the scanning range over the original and also match in the time required for reading the original.

Therefore, according to the image reader, although the image sensor including a plurality of image reading elements for reading an image from the different read target position between the case where a color image is read and the case where a monochrome image is read is used, the image can be read from the same range without increasing the time required for image read processing.

According to a second aspect of the invention, an image reader includes an image sensor, a relative move unit, a mode switch unit, and a control unit. The image sensor includes a color image reading device having a first read target position of the image sensor at which the color image reading device reads a part of an original and a monochrome image reading device having a second read target position of the image sensor, at which the monochrome image reading device reads the part of the original, different from the first read target position. The relative move unit moves one of an original and the image sensor relatively to the other of the original and the image sensor. The mode switch unit switches between a color mode and a monochrome mode. When the mode switch unit switches to the color mode, the control unit controls the image sensor and the relative move unit automatically to make the first read target position and a read position, from which the image sensor starts reading the original, be identical with each other. When the mode switch unit switches to the monochrome mode, the control unit controls the image sensor and the relative move unit automatically to making the second read target position and the read position be identical with each other.

BRIEF DESCRIPTION OF THE DRAWINGS

In the accompanying drawings:

FIGS. 7A and 7B are data structure drawings of white level correction data; FIG. 7A is a drawing corresponding to 300-dpi data and FIG. 7B is a drawing corresponding to 1200-dpi data.

DETAILED DESCRIPTION OF THE PREFERRED EMBODIMENT

An embodiment of the invention will be discussed.

Figure 1:
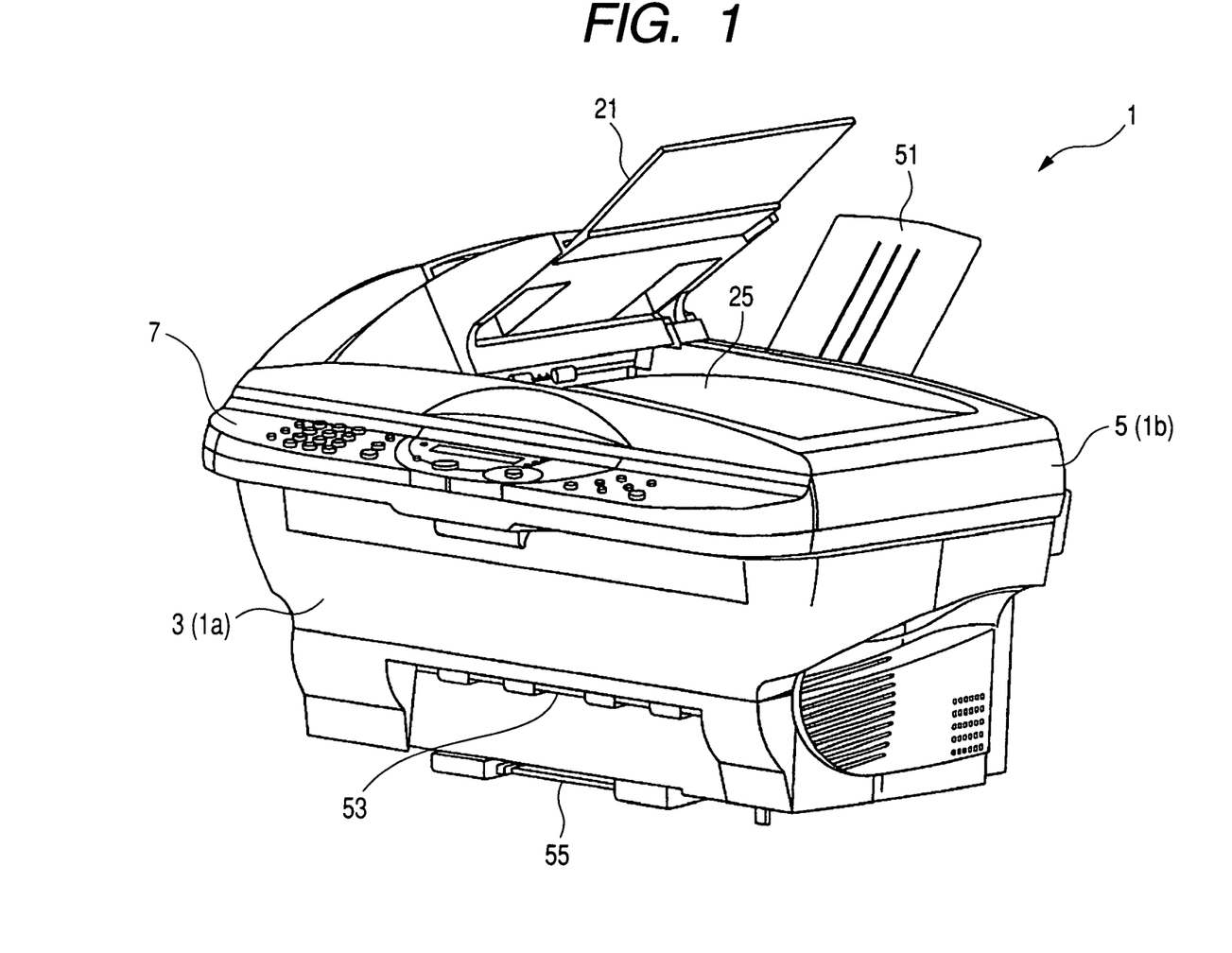
FIG. 1 is a perspective view to show a multi function device incorporating an image reader.

An image reader according to an embodiment of the invention is incorporated in a multi function device including the functions of an image scanner, printer, copier, and facsimile. FIG. 1 is a perspective view of a multi function device 1.

The multi function device 1 includes a clamshell type open/closing structure in which an upper main body 1b is attached to a lower main body 1a in such a manner that it can be opened and closed. The multi function device 1 includes an image formation apparatus 3 (in the embodiment, a laser printer) incorporated in the lower main body 1a and an image reader 5 incorporated in the upper main body 1b. An operation panel 7 is provided on the front of the upper main body 1b.

The image reader 5 is a reader including both an FB and an ADF. The image reader 5 also includes a clamshell type open/closing structure in which a cover section 5b is attached to a flatbed section 5a in such a manner that the cover section 5b can be opened and closed.

Figure 2:
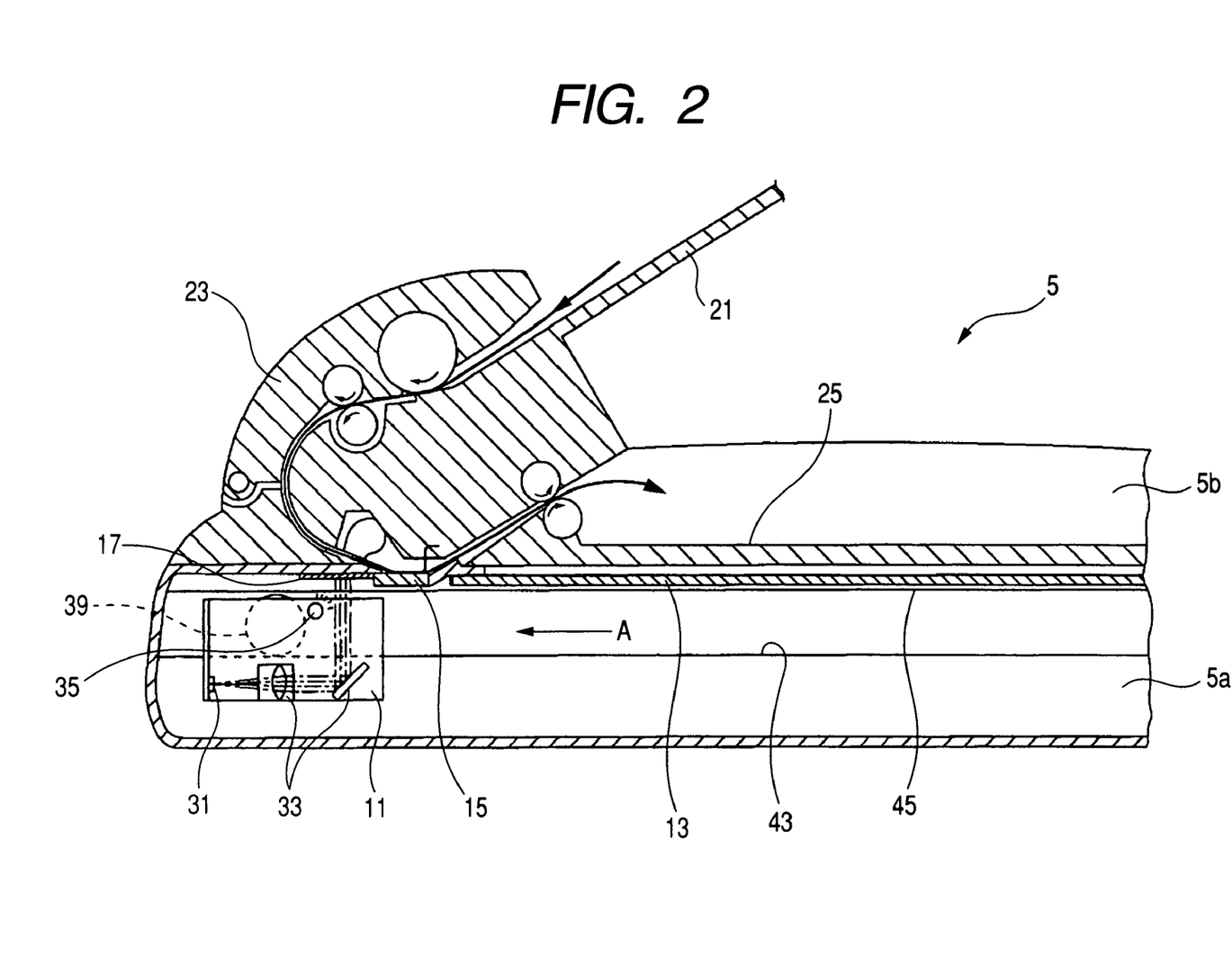
FIG. 2 is a longitudinal sectional view to show the image reader.

In the image reader 5, a read head 11, a first platen glass 13, a second platen glass 15, a white board 17, and the like are disposed in the flatbed section 5a, and an original supply tray 21, an original transporter 23, an original ejection tray 25, and the like are provided on the cover section 5b, as shown in FIG. 2.

The read head 11 includes an image sensor 31, an optical device group 33 made up of several lens and mirrors, and a light source 35. The read head 11 is configured so that the light source 34 applies light to an original existing at a read target position, the optical device group 33 gathers reflected light from the original on the image sensor 31, and the image sensor 31 reads an image.

Figure 3:
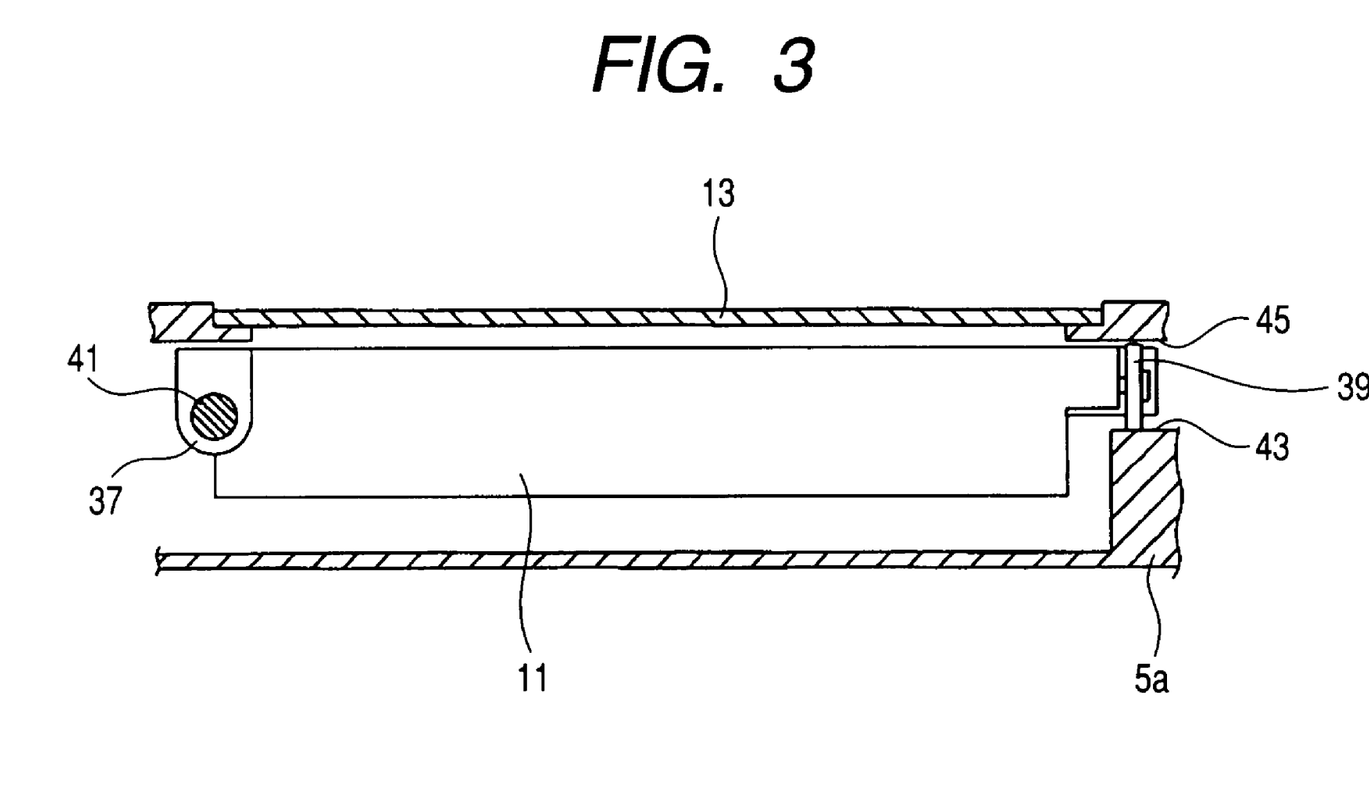
FIG. 3 is a longitudinal sectional view to show a read head and its periphery viewed from arrow A direction in FIG. 2.

The read head 11 includes a bearing 37 at one end and a roller 39 at the other end, as shown in FIG. 3. A guide bar 41 disposed in parallel to the first platen glass 13, the second platen glass 15, and the white board 17 in the flatbed section 5a is inserted into the bearing 37 and the roller 39 is placed on the top of a guide face 43, whereby the read head 11 is placed between the guide bar 41 and the guide face 43 and reciprocates along the guide bar 41. A part of the upper end of the roller 39 projects above the read head 11, as shown in FIG. 2. A guide section 45 is formed at a position producing a slight gap (in the embodiment, a gap of about 0.5 mm) with the roller 39. As such a structure is adopted, if a force acts on the read head 11 so as to rotate the read head 11 on the guide bar 41 due to vibration, etc., occurring when the multi function device 1 is transported, the roller 39 first abuts the guide section 45. Accordingly, rotation of the read head 11 is regulated, so that the main body of the read head 11 is prevented from coming into collision with the first platen glass 13, the second platen glass 15, and the white board 17.

The first platen glass 13 is used to read an image from an original on the FB. To read an image from an original using the FB, the user places the original on the first platen glass 13, presses the original against the first platen glass 13 in the cover section 5b, and in this state, performs predetermined operation on the operation panel 7 (for example, presses a read start button), whereby the image reader 5 reads the image from the original while moving the read head 11 along the first platen glass 13.

The second platen glass 15 is used to read an image from an original through the ADF. To read an image from an original using the ADF, the user sets the original on the original supply tray 21 and in this state, performs predetermined operation on the operation panel 7 (for example, presses the read start button), whereby the image reader 5 operates the original transporter 23 to transport the original from the original supply tray 21 to the original ejection tray 25, and reads the image from the original passing through the top of the second platen glass 15 with the read head 11 made still below the second platen glass 15.

The white board 17 is a member having a uniform density distribution of white. An image is read from the white board 17 and white level correction data required for converting the measurement data into ideal data is acquired. After this, the white level correction data is used to perform white level correction processing (shading correction processing).

The image formation apparatus 3 incorporated in the lower main body 1a of the multi function device 1 takes in a sheet recording medium (for example, paper) from a paper feed tray 51 on the rear of the multi function device 1, forms an image on the record side of the recording medium, and ejects the recording medium with the image recorded thereon from a paper ejection port 53 on the front of the multi function device 1, as shown in FIG. 1. A paper ejection tray 55 of a pull-out drawer is stored below the paper ejection port 53 and can be pulled out as required for receiving record paper ejected from the paper ejection port 53.

Next, the read head 11 will be discussed in more detail.

Figure 4:
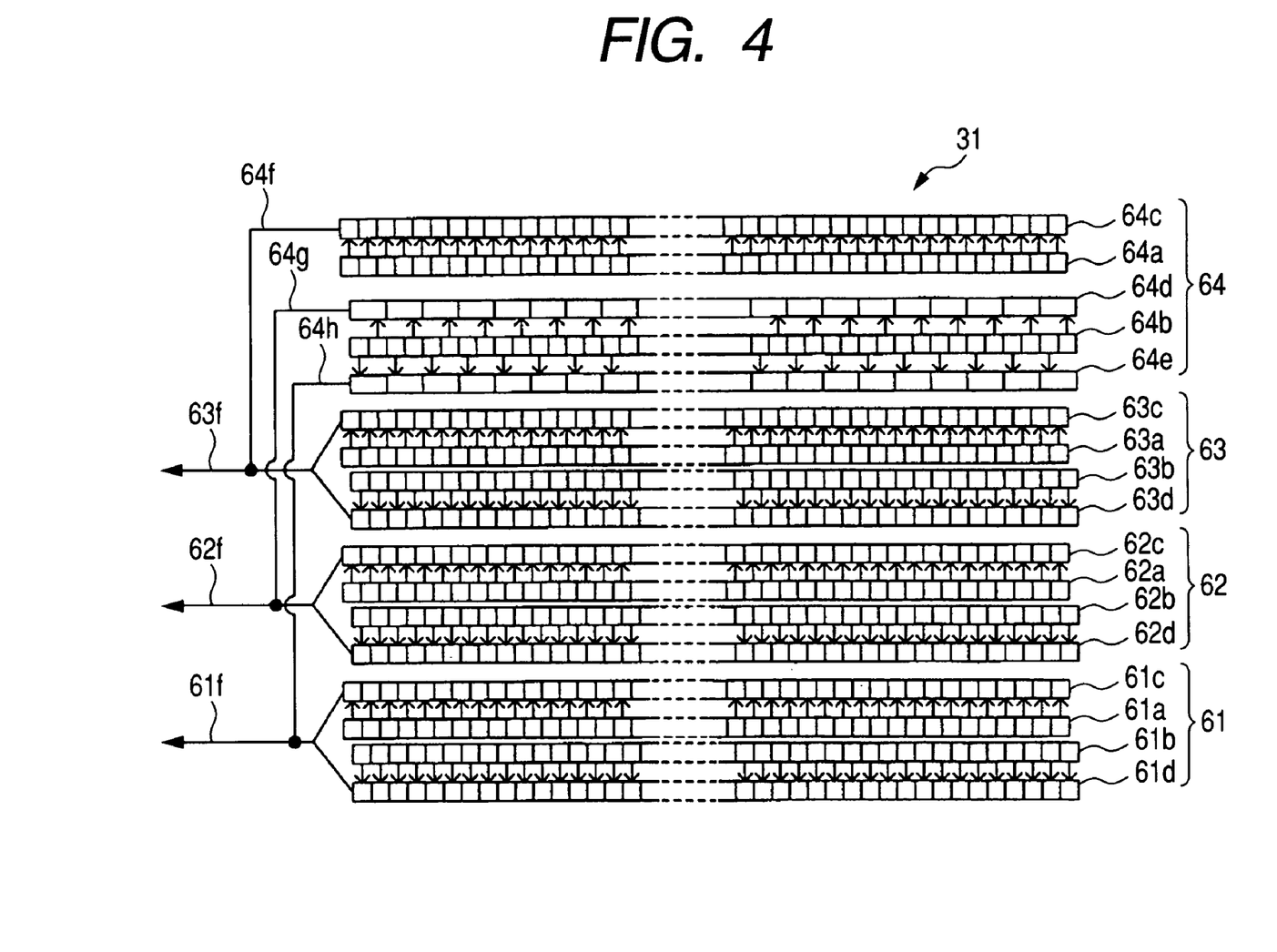
FIG. 4 is a drawing to schematically show the configuration of an image sensor.

The image sensor 31 included in the read head 11 is a four-line linear image sensor including three image reading elements 61, 62, and 63 corresponding to R (red), G (green), and B (blue), which serve as color image reading elements, and one image reading element 64, which serve as a monochrome image reading element, as shown in FIG. 4.

The R (red) image reading element 61 forming a part of the color image reading elements includes photoelectric conversion sections 61a and 61b implemented by photodiode arrays (called photoelectric conversion element arrays in the invention), charge transfer sections 61c and 61d implemented by CCD shift registers (called buffers in the invention), and one channel 61f for outputting data from the charge transfer sections 61c and 61d.

The photoelectric conversion sections 61a and 61b are implemented each by one photodiode array. The photoelectric conversion sections 61a and 61b are shifted by half a photo diode, namely, half a pixel relatively, so that the photo diode arrays are formed in a staggered arrangement as a whole of the photo electric conversion sections 61a and 61b. The photo diodes in each row of the photoelectric conversion sections 61a and 61b are arranged at a density of 600 dpi (dots per inch). Both the photoelectric conversion sections 61a and 61b can be used to read an image at 1200 dpi.

The charge transfer sections 61c and 61d are analog shift registers for receiving charges, which are simultaneously transferred in parallel by the photoelectric conversion sections 61a and 61b, and shifting the charge amounts in series in order to output the charge amounts to the output side. Each of the G (green) image reading element 62 and the B (blue) image reading element 63 has a similar configuration to that of the R (red) image reading element 61 except that they differ in color filter. That is, in FIG. 4, numerals 62a, 62b, 63a, and 63b denote photoelectric conversion sections, numerals 62c, 62d, 63c, and 63d denote charge transfer sections, and numerals 62f and 63f denote channels. FIG. 4 shows only the numerals of the sections and the channels thereof, and the sections and the channels will not be discussed in detail.

The image reading element 64 forming the monochrome image reading element includes photoelectric conversion sections 64a and 64b implemented by photodiode arrays, charge transfer sections 64c, 64d, and 64e implemented by CCD shift registers, and three channels 64f, 64g, and 64h for outputting data from the charge transfer sections 64c, 64d, and 64e.

The photoelectric conversion sections 64a and 64b have similar structures to those of the photoelectric conversion sections 61a and 61b described above. The photodiodes in each row of the photoelectric conversion sections 64a and 64b are arranged at a density of 600 dpi. Both the photoelectric conversion sections 64a and 64b can be used to read an image at 1200 dpi. The image reading element 64 has a higher sensitivity than the color image reading elements 61 to 63 because no color filter exists on the surface of each photodiode.

The charge transfer sections 64c, 64d, and 64e are analog shift registers for receiving charges, which are simultaneously transferred in parallel by the photoelectric conversion sections 64a and 64b, and shifting the charge amounts in series in order to output the charge amounts to the output side. The charge transfer section 64c receives charges provided by the photoelectric conversion section 64a, the charge transfer section 64d receives charges provided by the odd-numbered elements of the photoelectric conversion section 64b, and the charge transfer section 64e receives charges provided by the even-numbered elements of the photoelectric conversion section 64b. Here, the arrangement order of the elements is counted from right to left in FIG. 4.

Such a configuration makes it possible not only to provide 1200-dpi data as output from the three charge transfer sections 64c, 64d, and 64e, but also to provide 600-dpi data as output from the one charge transfer section 64c or the two charge transfer sections 64d and 64e. Also, 300-dpi data can be provided as output from any one of the three charge transfer sections 64c, 64d, 64e. In a case of provide 300-dpi data, the 600-dpi data provided by the charge transfer section 64c can be converted into 300 dpi data (adding the charges provided by the odd-numbered and even-numbered elements) to provide higher-image-quality 300-dpi data, which will be hereinafter also called high-image-quality 300-dpi data. Alternatively, 300-dpi data can also be provided at higher speed without executing conversion by either the charge transfer section 64d or 64e, which will be hereinafter also called high-speed 300-dpi data.

The three channels 64f, 64g, and 64h for outputting data from the charge transfer sections 64c, 64d, and 64e share data output terminals with the three channels 61f, 62f, and 63f of the color image reading elements 61 to 63. Thus, the data is transmitted through the data output terminals regardless of which of a color image and a monochrome image is read. To transfer data, switching is performed between the color image reading elements 61 to 63 and the monochrome image reading element 64 as color or monochrome mode is selected through a selector (not shown).

As the described image reading elements 61 to 64, the arrangement direction of the photodiodes making up the photoelectric conversion sections is a main scanning direction and a plurality of photodiode rows are spaced from each other in a subscanning direction orthogonal to the main scanning direction. The spacing in the subscanning direction is adjusted so as to become an integral multiple of the size of each element (one-line read width corresponding to the maximum read resolution). Therefore, if an image of one line is read at a timing with considering the spacing in the subscanning direction while an original and the read head 11 are moved relatively in the read resolution units in the subscanning direction, the image of one line can be read from the same position on the original although the image reading elements 61 to 64 differ in read target position.

Figure 5:
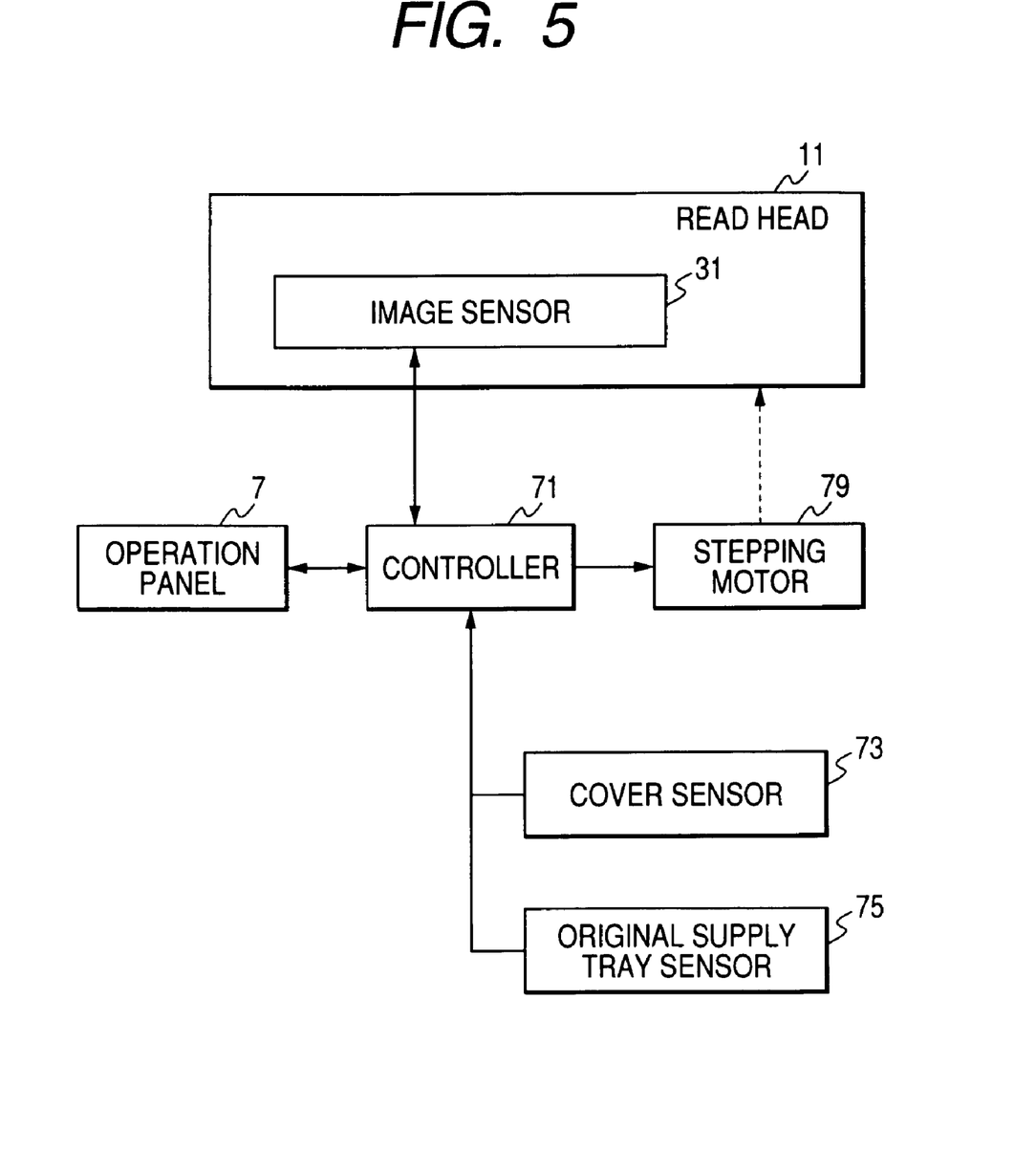
FIG. 5 is a block diagram to show a control system of the image reader.

The image reader 5 further includes a controller 71 for controlling the whole operation of the image reader 5, a cover sensor 73 for detecting open/closing operation of the cover section 5b, and an original supply tray sensor 75 for detecting an original being set on the original supply tray 21, as shown in FIG. 5. A stepping motor 79 for driving the original transporter 23 and the read head 11 so as to move them in the subscanning direction, the operation panel 7, and the like are connected to the controller 71.

The controller 71 includes a known microcomputer, a control circuit controlling the operation of the image sensor 31 and the stepping motor 79, a data input circuit for inputting data from the image sensor 31, memory, an interface circuit with a control system involved in the image formation apparatus 3 and a control system involved in a communication unit, and the like. When the controller 71 operates in accordance with a program stored in the memory, the image sensor 31 is controlled to execute various types of image read processing such as switching between the color and monochrome modes and changing the resolution.

The multi function device 1 includes the control system involved in the image formation apparatus 3 and the control system involved in the communication unit in addition to the control system involved in the image reader 5. In the multi function device 1, the control systems provide the functions of printer, copier, and facsimile in conjunction with each other. However, the control systems for the image formation apparatus 3 and the communication unit are not the main part of the invention and therefore will not be discussed or shown.

Figure 6:
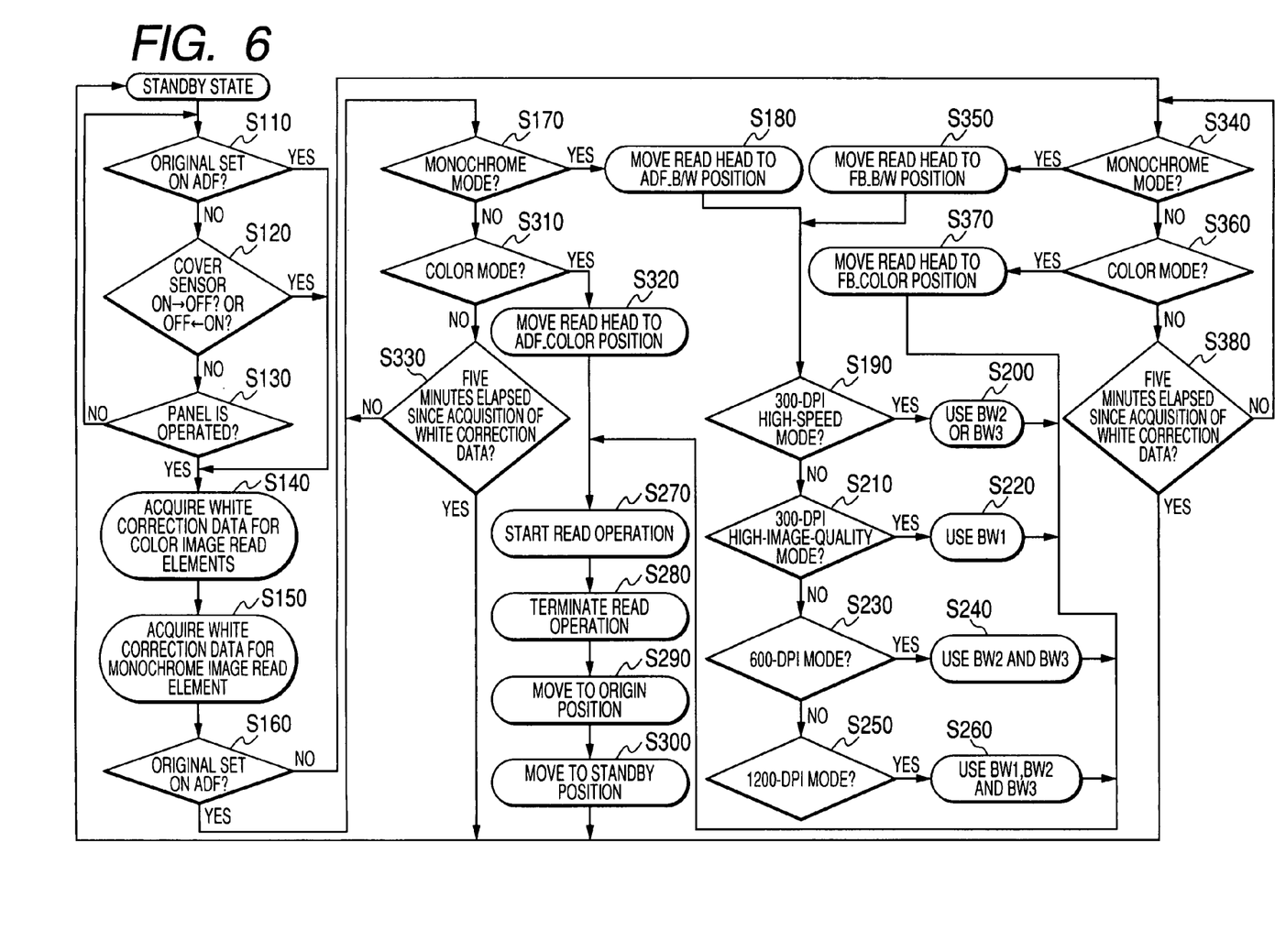
FIG. 6 is a flowchart to show image read processing.

Next, the image read processing executed by the image reader 5 will be discussed with reference to a flowchart of FIG. 6. The image read processing is processing always executed by the controller 71 when the image reader 5 operates.

First, the controller 71 checks whether or not an original is set on the ADF (original supply tray 21 of the original transporter 23) by the original supply tray sensor 75 (S110). The controller 71 checks whether the state of the cover section 5b changes from the open state to the closed state or from the closed state to the open state by the cover sensor 73 (S120). Further, the controller 71 checks whether or not some operation is performed on the operation panel 7 (S130). If none of the events are detected (NO at S110, NO at S120, and NO at S130), S110 to S130 are repeated.

On the other hand, if any of the events is detected (YES at S110, YES at S120, or YES at S130), the white level correction data of each of color image reading elements and the monochrome image reading element is acquired (S140 and S150). While the read head 11 is actually moved within the range of the white board 17, an image is read at several points from the white board 17 and the white level correction data is calculated based on the difference between the measurement data and the ideal data. In the image reader 5, the color image reading elements and the monochrome image reading element share the three data output terminals and therefore first the white level correction data for the color image reading elements is acquired and then that for the monochrome image reading element is acquired. The white level correction data corresponding to each of the resolutions 300 dpi, 600 dpi, and 1200 dpi is acquired.

Since the read elements used to read an image at the resolution 300 dpi, 600 dpi are always used to read an image at the resolution 1200 dpi, the white level correction data corresponding to 300 dpi, 600 dpi can be extracted from the white level correction data corresponding to 1200 dpi.

Figure 7A:
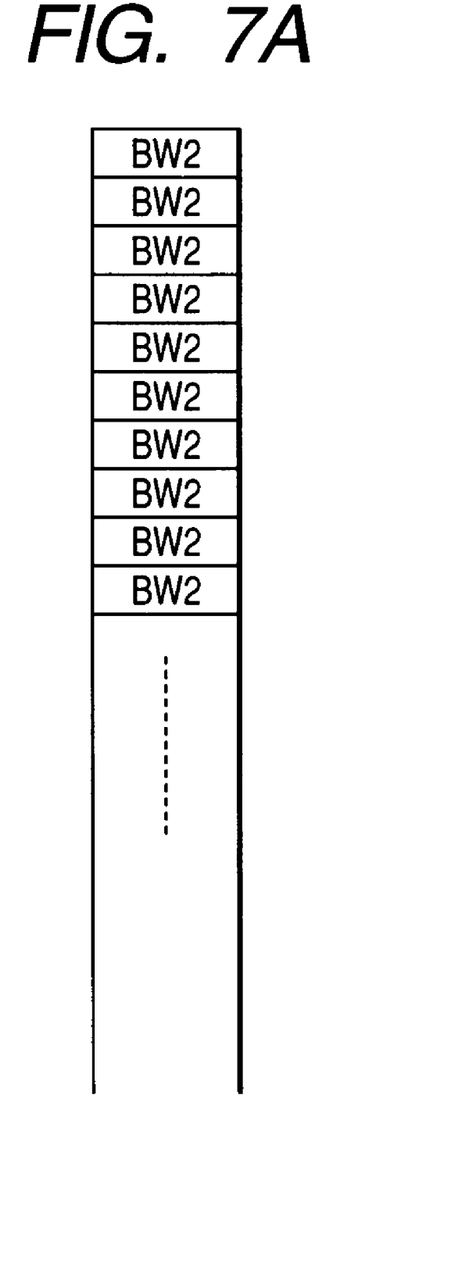
Figure 7B:
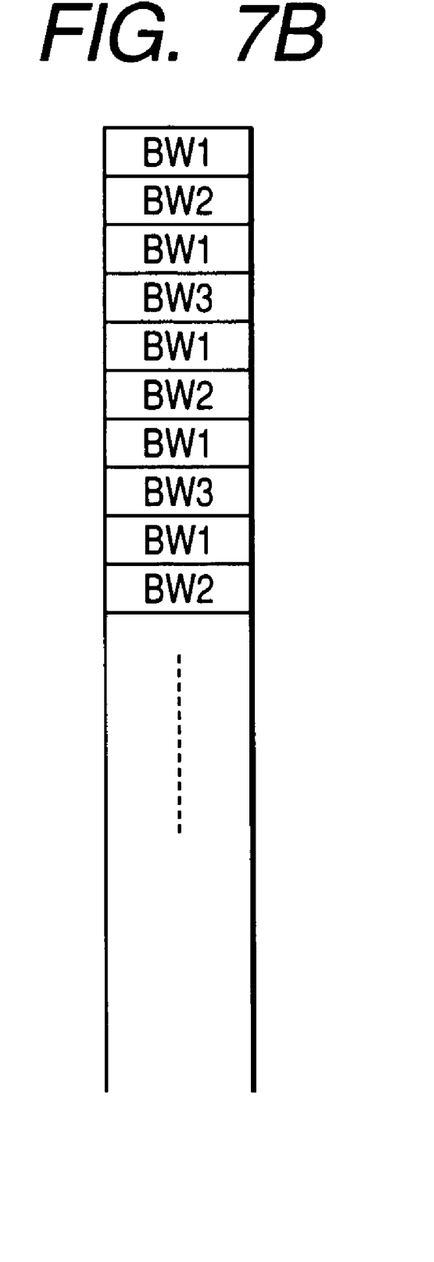

For example, the white level correction data corresponding to 300 dpi and that corresponding to 1200 dpi are of the data structures as shown in FIGS. 7A and 7B. In FIGS. 7A and 7B, data BW1 is data sent through the channel 64f from the charge transfer section 64c; data BW2 is data sent through the channel 64g from the charge transfer section 64d; and data BW3 is data sent through the channel 64h from the charge transfer section 64e. Since the white level correction data corresponding to 1200 dpi contains the data BW2, the white level correction data corresponding to 300 dpi can be extracted from the white level correction data corresponding to 1200 dpi as shown in FIG. 7B.

However, the white level correction data corresponding to 1200 dpi contains the white level correction data BW2 and BW3 corresponding to the resolutions 300 dpi and 600 dpi, and any other data (for example, data BW1 required only at 1200 dpi) alternately. Thus, to extract the white level correction data corresponding to 300 dpi or 600 dpi from the white level correction data corresponding to 1200 dpi as shown in FIG. 7B, white level correction processing must be executed while unnecessary data is skipped. As a result, the processing time grows accordingly.

In contrast, if the data corresponding to the resolution 300 dpi (or 600 dpi) as shown in FIG. 7A is previously acquired aside from the data corresponding to the resolution 1200 dpi as shown in FIG. 7B, the additional skip processing becomes unnecessary and the white level correction processing can be performed rapidly.

Referring again to FIG. 6, whether or not an original is set on the ADF is again checked by the original supply tray sensor 75 (S160). If an original is set (YES at S160), whether or not the monochrome mode is specified on the operation panel 7 is checked (S170). If the monochrome mode is specified (YES at S170), the stepping motor 79 is controlled for moving the read head 11 to an ADF_B/W position (see FIG. 8; described later in detail) (S180). Since the image sensor 31 does not read an image at the moving time, the read head 11 is moved at higher speed than that when an image is read.

Subsequently, if the resolution mode is 300-dpi high-speed mode (YES at S190), use of the white level correction data corresponding to the 300-dpi high-speed mode is set (S200). The white level correction data corresponding to the 300-dpi high-speed mode is a correction value equivalent to 300 dpi provided through either the charge transfer section 64d or 64e from the image reading element 64 of the image sensor 31.

If the resolution mode is 300-dpi high-image-quality mode (YES at S210), use of the white level correction data corresponding to the 300-dpi high-image-quality mode is set (S220). The white level correction data corresponding to the 300-dpi high-image-quality mode is a correction value equivalent to 600 dpi provided through the charge transfer section 64c from the image reading element 64 of the image sensor 31.

If the resolution mode is 600-dpi mode (YES at S230), use of the white level correction data corresponding to the 600-dpi mode is set (S240). The white level correction data corresponding to the 600-dpi mode is a correction value equivalent to 600 dpi provided through both of the charge transfer sections 64d and 64e from the image reading element 64 of the image sensor 31.

If the resolution mode is 1200-dpi mode (YES at S250), use of the white level correction data corresponding to the 1200-dpi mode is set (S260). The white level correction data corresponding to the 1200-dpi mode is a correction value equivalent to 1200 dpi provided through all of the charge transfer sections 63c, 64d, and 64e from the image reading element 64 of the image sensor 31.

If the white level correction data to be used is determined through steps S190 to S260, hereinafter the operation of reading an image from the original is started in accordance with a read start command of the user (S270). In the read operation, in case of read an image from the original using the FB, while the read head 11 moves along the first platen glass 13, the image reader 5 (read head 11) reads the image from the original. In a case of reading an image from the original using the ADF, the original transporter 23 transports the original from the original supply tray 21 to the original ejection tray 25, and the image reader 5 (read head 11) reads the image from the original passing through the top of the second platen glass 15 with the read head 11 made still below the second platen glass 15. The operation is well known and therefore will not be discussed again in detail.

Subsequently, at the termination of the read operation (S280), the read head 11 is once moved to an origin position (S290) and is moved to a standby position (S300). Then, the steps starting at S110 are repeated.

If it is determined at S170 that the monochrome mode is not specified (NO at S170), whether or not the color mode is specified on the operation panel 7 is checked (S310). If the color mode is specified (YES at S310), the stepping motor 79 is controlled to move the read head 11 to an ADF_color position (see FIG. 8; described later in detail) (S320). Since the image sensor 31 does not read an image at the moving time, the read head 11 is moved at higher speed than that when an image is read (S270). Then, steps S270 to S300 described above are executed and the steps starting at S110 are repeated.

By the way, the image sensor 31 reads an image at S270 and thus the read head 11 is moved at lower speed than at S180. Further, the move speed of the read head 11 is also changed depending on which of the color mode and the monochrome mode is specified. That is, the monochrome mode places importance on high speed as compared with the color mode. Specifically, the distance from the light source 35 to a read target position bw is shorter than the distance from the light source 35 to a read target position b, and the read target position bw is brighter than the read target position b. Moreover, the color image reading elements 61 to 63 also involve sensitivity degradation because of the presence of the color filter and thus the monochrome image reading element 64 can read an image of one line in a shorter time than the color image reading elements 61 to 63. Then, in the monochrome mode, the read head 11 is moved at higher speed than that in the color mode, thereby performing rapid read processing. In the color mode, the read head 11 is moved at lower speed than that in the monochrome mode, thereby providing a sufficient light exposure time for the image sensor 31 to read an image of one line.

On the other hand, if it is determined at S310 that the color mode is not specified (NO at S310), whether or not five minutes has elapsed since the white level correction data was acquired at S140, S150 is checked (S330). If the elapsed time is less than five minutes (NO at S330), the process returns to S170 and a wait is made until the color mode or the monochrome mode is specified. If the elapsed time is equal to or greater than five minutes (YES at S330), the process returns to S110 and the processing is again performed from the beginning. The reason why the processing is thus made to branch depending on the elapsed time is described below. If a long time has elapsed since the white level correction data was acquired, the characteristics of the image sensor 31, etc., may vary and unless the white level correction data is also changed accordingly, it is made impossible to execute proper white level correction.

If it is determined at S160 that an original is not set (NO at S160), whether or not the monochrome mode is specified on the operation panel 7 is checked (S340). If the monochrome mode is specified (YES at S340), the stepping motor 79 is controlled to moving the read head 11 to an FB_B/W position (see FIG. 8; described later in detail) (S350). Since the image sensor 31 does not read an image at the moving time, the read head 11 is moved at higher speed than that when an image is read. Then, steps S190 to S260 are executed and S270 to S300 are executed through and the steps starting at S110 are repeated. Since the monochrome mode is specified, read processing is executed at higher speed at S270 than that in the color mode, as described above.

If it is determined at S340 that the monochrome mode is not specified (NO at S340), whether or not the color mode is specified on the operation panel 7 is checked (S360). If the color mode is specified (YES at S360), the stepping motor 79 is controlled to move the read head 11 to an FD_color position (see FIG. 8; described later in detail) (S370). Since the image sensor 31 does not read an image at the moving time, the read head 11 is moved at higher speed than that when an image is read. Then, steps S270 to S300 described above are executed and the steps starting at S111 are repeated. Since the color mode is specified, read processing is executed at lower speed at S270 than that in the monochrome mode, as described above.

On the other hand, if it is determined at S360 that the color mode is not specified (NO at S360), whether or not five minutes has elapsed since the white level correction data was acquired at S140, S150 is checked (S380). If the elapsed time is less than five minutes (NO at S380), the process returns to S340 and a wait is made until the color mode or the monochrome mode is specified. If the elapsed time is equal to or greater than five minutes (YES at S380), the process returns to S110 and the processing is again performed from the beginning.

In the described image read processing, four specification combinations of use of the ADF or the FB and selection of the color mode or the monochrome mode are possible; the four combinations are in a one-to-one correspondence with steps S180, S320, S350, and S370 and any of the processing sequences is executed as specified.

Figure 8:
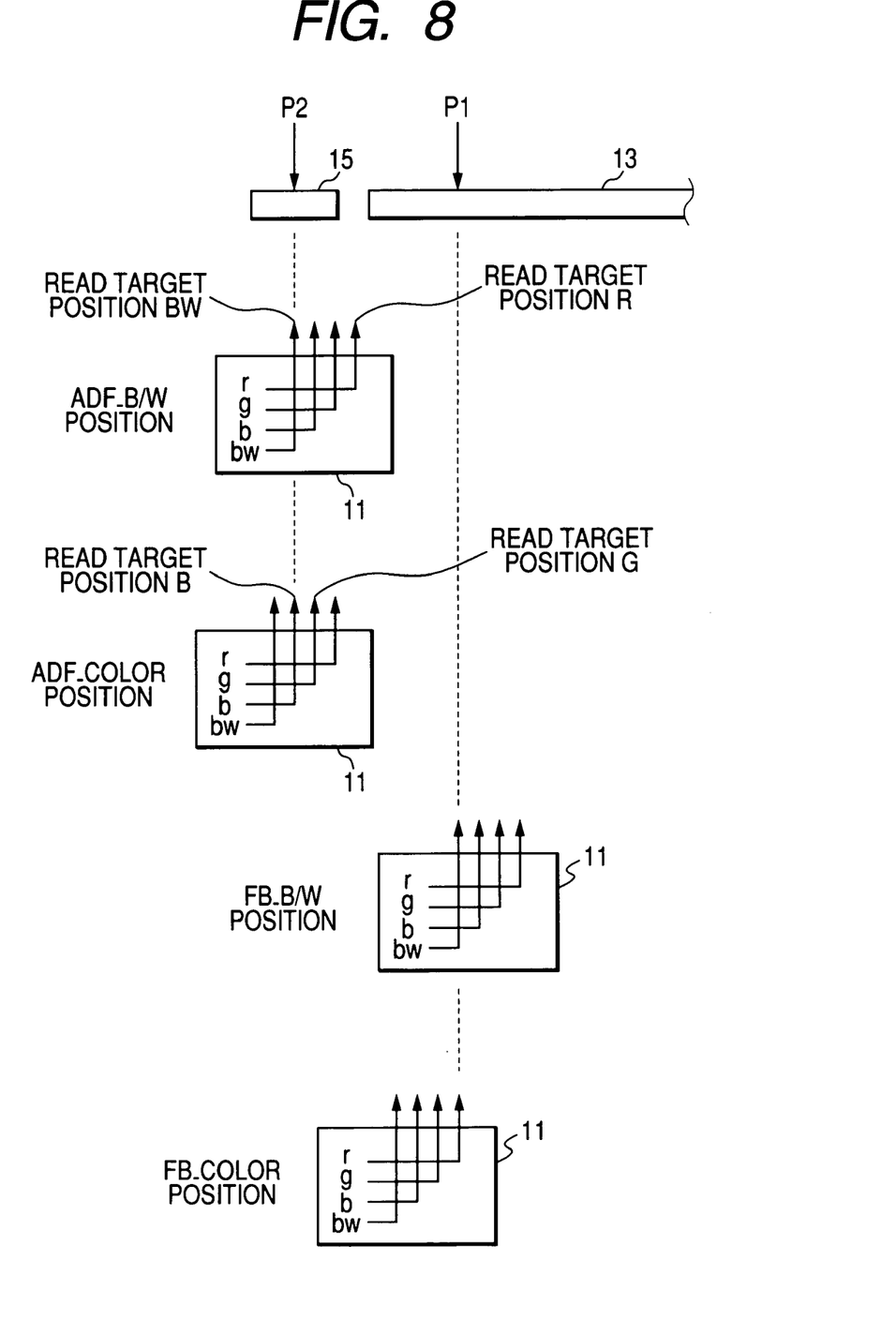
FIG. 8 is a schematic representation to show the positional relationship between first, second read position and read start position.

FIG. 8 is a drawing to show the positional relationship between the read target position r, g, b, bw of the image reading element 61-64 and read start position p1 in the FB and read position p2 in the ADF. In FIG. 8, arrows extending from the characters "r", "g", "b", and "bw" in the read head 11 denote light paths to the image reading elements 61-64. For the sake of simplicity of the explanation, tip ends of the arrows shown in FIG. 8 are designated as the read target positions r, g, b, bw. However, since the arrows denote the light paths, the arrows should be extended until the arrows collide with an obstacle. Therefore, the actual read target positions r, g, b, bw are intersections between extension lines of the arrows and an upper surface of the first or second platen glass 13, 15. For example, in the uppermost case of FIG. 8, the read target position bw is identical with the read position p2. In this case, if the light source 35 emits light, the image reading element 64 can read a part of the original located at the read target position bw (the read position p2).

If the monochrome mode using the ADF is specified, S180 is executed and the read head 11 is moved to the ADF_B/W position in FIG. 8. When the read head 11 is located at the ADF_B/W position, the read target position bw of the image reading element 64 and the read position p2 in the ADF match.

If the color mode using the ADF is specified, S320 is executed and the read head 11 is moved to the ADF_color position in FIG. 8. When the read head 11 is located at the ADF_color position, the read target position b of the image reading element 63 and the read position p2 in the ADF match.

In the color mode using the ADF, the read target position b of the image reading element 63 is taken as a reference. However, the reference is determined by an original transport direction through the ADF and the arrangement order of the read target positions r, g, and b. If the original transport direction is reversed or the arrangement order of the read target positions r, g, and b is changed, the reference may be changed to any of the read target positions r, and g.

If the monochrome mode not using the ADF is specified, S350 is executed and the read head 11 is moved to the FB_B/W position in FIG. 8. When the read head 11 is located at the FB_B/W position, the read target position bw of the image reading element 64 and the read start position p1 in the FB match.

If the color mode not using the ADF is specified, S370 is executed and the read head 11 is moved to the FB_color position in FIG. 8. When the read head 11 is located at the FB_color position, the read target position r of the image reading element 61 and the read start position p1 in the FB match.

In the color mode not using the ADF, the read target position r of the image reading element 61 is taken as a reference. However, the reference is determined by the move direction of the read head 11 in the FB and the arrangement order of the read target positions r, g, and b. If the move direction of the read head 11 in the FB is reversed or the arrangement order of the read target positions r, g, and b is changed, the reference may be changed to any of the read target position g or b.

The read target positions r, g, b, bw correspond to positions where the image reading elements 61-64 are arranged on the image sensor 31, respectively. With reference to FIG. 4, each of image reading elements 61-64 has the two arrays of photoelectric conversion sections. Therefore, accurately, each of image reading elements 61-64 has two positions, which may correspond to the read target positions r, g, b, bw. However, since the two arrays of photoelectric conversion sections for each color are very close to each other, there arises no problem when either of positions of the two arrays of photoelectric conversion sections is made to correspond to the read target position. Alternatively, an intermediate position between the two arrays of photoelectric conversion sections is made to correspond to the read target position. In the embodiment, when the read head 11 is located at the ADF_color position, the read target position b (the blue image reading element 63) and the read position p2, which serves as a reference, match. This case has a disadvantage because the red image reading element 61 becomes far from the read position p2, which serves as the reference. Practically, in the case of an image sensor having a filter, the blue image reading element 63 has lower sensitivity than the other image reading elements 61 and 62 and the red image reading elements 61 has high sensitivity. Therefore, there arises no problem. On the contrary, this situation is advantageous in compensating the low sensitivity of the blue image reading element 63. If it is possible to make the sensitivities of the image reading elements 61-63 by devising a filter, the read target position g (corresponding to the green image reading element 62 located at a center of the image reading elements 61-63) and the read position p2, which serves as the reference, match.

As described above, according to the image reader 5 included in the multi function device 1, if the mode is switched to the color mode through the operation panel 7, before execution of the processing sequence starting at S270, the controller 71 included in the image reader 5 matches the read start position p1 in the FB with the read target position r or matches the read position p2 in the ADF with the read target position b regardless of whether or not the user enters an original read start command. Then, if the user enters an original read start command, the processing sequence starting at S270 is executed, whereby the original is read while the relative position between the read target position r or b and the original is changed. On the other hand, if the mode is switched to the monochrome mode through the operation panel 7, before execution of the processing sequence starting at S270, the controller 71 matches the read start position p1 in the FB with the read target position bw or matches the read position p2 in the ADF with the read target position bw regardless of whether or not the user enters an original read start command. Then, if the user enters an original read start command, the processing sequence starting at S270 is executed, whereby the original is read while the relative position between the read target position bw and the original is changed.

The operation until the read start position on the original and the first or second read target position are matched with each other is executed at a point of time when the mode is switched through the operation panel 7 regardless of whether or not the user enters an original read start command. Therefore, the operation does not cause the processing time to grow after the user enters an original read start command. Then, if the user enters an original read start command, the case where a color image is read and the case where a monochrome image become different in the relative positional relationship. Thus, even if the timing of starting a relative move from a certain position and the timing of starting actual original read processing in the image sensor 31 of the read head 11 are matched between the case where a color image is read and the case where a monochrome image is read, the scanning ranges over the original are identical in the both cases and also the time required for reading the original are identical in the both cases.

Therefore, according to the image reader 5, although the four-line image sensor 31 for reading an image from the different read target position r, b, bw between the case where a color image is read and the case where a monochrome image is read is used, the image can be read from the same range without increasing the time required for image read processing.

Particularly, in the image reader 5, the image sensor 41 is of four-line type and thus the spacing between the read target positions corresponding to the lines at the most distant positions tends to become large as compared with the case where the number of lines is small. To use the FB, the read target positions r and bw become opposite to each other with the remaining read target positions g and b sandwiched therebetween and therefore are easily largely distant from each other. However, the read head 11 is moved in advance as described above, so that the operation time from the image read start to the read end can be made the same regardless of which line the first image read line is.

In the image reader 5, at S270, at a time of moving the read head 11 from the standby position to the position where either of the read target positions b or r and the read start position are matched with each other, the read head 11 is moved at higher speed than that when an original is read. Thus, processing of moving the read head 11 to a position where the read target positions bw, r, or b and the read start position are matched with each other is rapidly completed as compared with the case where the read head 11 is moved at the same speed as that when an original is read.

Further, in the image reader 5, the controller 71 executing S140 and S150 acquires the white level correction data of each image reading element for both the color image reading elements 61 to 63 and the monochrome image reading element 64 regardless of whether or not the user makes specification as to selection of the color or monochrome mode. Thus, acquiring the white level correction data can be started at the stage before the user selects the color or monochrome mode in comparison with the case where the white level correction data is acquired for either the color image reading elements or the monochrome image reading element in response to the selected mode after the user selects the color or monochrome mode. Therefore, acquiring the white level correction data can be completed at an earlier timing.

Moreover, acquiring the white level correction data is started when at least one of the following events is detected at S110 to S130: Presence of an original to be read; opening the cover section 5b covering the original placement face to place the original to be read; closing the cover section 5b; and the user operating the operation panel 7 to enter a command. Thus, the possibility that the user will later give an image read command is extremely high. Therefore, waste of acquiring the white level correction data can be lessened and power consumption and the mechanical load can be decreased as compared with, for example, the case where the white level correction data is acquired on a regular basis or according to any other condition.

At S140 and S150, the white level correction data corresponding to all resolutions that can be specified is acquired before the resolution for reading an image is specified. Thus, it takes time in acquiring the white level correction data corresponding to all resolutions, but it is not necessary to wait for the resolution to be specified. Therefore, acquiring the white level correction data can be started at an earlier timing and the time at which acquiring the white level correction data is finally completed can be advanced. To perform actual white level correction processing, the white level correction data corresponding to the specified resolution is also provided, so that rapid data processing can be performed as compared with the configuration for extracting only the necessary data from the data containing excessive data.

Further, according to the image reader 5, the three channels 64f, 64g, and 64h of the monochrome image reading element and the three channels 61f, 62f, and 63f of the color image reading elements share the data output terminals. Thus, to acquire the white level correction data of each image reading element, after completion of processing of either of the color image reading elements or the monochrome image reading element, processing of the other must be started, and there is a possibility of requiring more time from the processing start to completion than that in the case where processing of the color image reading elements and processing of the monochrome image reading element can be performed in parallel. However, the timing acquiring the white level correction data is sufficiently early as compared with the image read start timing as described above, so that a problem of delaying image read as the white level correction data is acquired is not involved.

In addition, according to the image reader 5, the read target position bw is brighter than the read target position r, b and the read sensitivity at the read target position bw can be made higher than that at the read target position r, b. Therefore, to read a monochrome image, higher-speed scanning is made possible.

Although the embodiment of the invention has been described, it should be understood that the invention is not limited to the specific embodiment described above and changes and variations may be made without departing from the spirit and the scope of the invention.

For example, the image reader 5 including the FB and the ADF is illustrated in the embodiment, but the configuration of the invention can also be adopted for an image reader including either an FB or an ADF.

In the embodiment, to use the ADF, the read head 11 is moved without changing the original transport amount, whereby the read start position on the original and the read target position bw, b, or r are matched with each other in response to the color or monochrome mode. However, the read start position on the original and the read target position bw, b, or r may be matched with each other in response to the color or monochrome mode by changing the original transport amount without moving the read head 11. If such a configuration is adopted, in a case of the image reader including only ADF, even if the read target position bw, b, or r exists, the original transport amount before read processing starts is optimized matching the read target position bw, b, or r.

In the embodiment, the white level correction data corresponding to all resolutions that can be specified is acquired before the resolution is specified. However, after the resolution for reading an image is specified, the white level correction data corresponding only to the specified resolution may be acquired. However, the configuration as in the embodiment is advantageous for enhancing the processing speed because the data processing amount when actual white level correction is executed lessens although prior data processing amount increases.

In the image reader according to the embodiment, the color image reading element, which reads a part of the original first, in a case where the original is moved (ADF) differs from that in a case where the image sensor is moved (FB). Thus, if either one of the different color image reading elements is also used as the monochrome image reading element or is adjacent to the monochrome image reading element, the other can read an image at a position distant from the read target position of the monochrome image reading element. Therefore, the read target positions bw, b, r become more distant from each other at least in either one of the case of ADF and the case of FB than in the other case. Nevertheless, the image can be read from the same range without increasing the time required for image read processing.

What is claimed is:

1. An image reader comprising:
    an image sensor including:
        plural sets of color image reading elements that read a part of an original, which is located at a first read target position of the image sensor, as a color image; and
        plural sets of monochrome image reading elements located at a different position than the plural sets of color image reading elements that read the part of the original, which is located at a second read target position of the image sensor different from the first read target position, as a monochrome image;
    a detection unit that detects at least one of:
        that the original to be read is present on an automatic document feeder;
        that a cover is open, the cover covering an original placement face where the original to be read is placed; and
        that the cover is closed;
    a carriage that includes the image sensor, the carriage being movable along a sub-scan direction during an image reading operation;
    a mode switch unit that switches between a color mode and a monochrome mode in accordance with a user's instruction; and
    a control unit, wherein:
        before the control unit accepts a start request by a user, when the mode switch unit switches to the color mode and when the detection unit detects that the original is present on the automatic document feeder, the control unit moves the carriage to a first position;
        before the control unit accepts a start request by a user, when the mode switch unit switches to the monochrome mode and when the detection unit detects that the original is present on the automatic document feeder, the control unit moves the carriage to a second position that is located a predetermined distance from the first position along the sub-scan direction;
        when the detection unit detects that the cover is open or closed and the mode switch unit switches to the monochrome mode, the control unit moves the carriage to a third position; and
        when the detection unit detects that the cover is open or closed and the mode switch unit switches to the color mode, the control unit moves the carriage to a fourth position that is located the predetermined distance from the third position along the sub-scan direction.

2. The image reader according to claim 1, wherein:
    when the mode switch unit switches to the monochrome mode, after another user's instruction for starting reading of the original, the control unit repeats making the plural sets of monochrome image reading elements read the part of the original and making the carriage move the image sensor, to obtain a monochrome image corresponding to the original; and
    when the mode switch unit switches to the color mode, after the other user's instruction for starting reading of the original, the control unit repeats making the plural sets of color image reading elements read the part of the original and making the carriage move the image sensor, to obtain a color image corresponding to the original.

3. The image reader according to claim 2, wherein:
    the plural sets of color image reading elements include respective different read target positions;
    the plural sets of color image reading elements are configured so that when the carriage moves the image sensor, a same position on the original subsequently passes through the different read target positions and the plural sets of color image reading elements read the part of the original when the carriage passes through the different read target positions; and
    when the mode switch unit switches to the color mode, the control unit makes one of the read target positions, which corresponds to one set of the color image reading elements that first read the part of the original, be the first read target position.

4. The image reader according to claim 3, wherein:
    the carriage has at least one of an original move mode in which the original moves and the carriage and the image sensor are still and an image sensor move mode in which the original is still and the carriage moves the image sensor; and
    in at least one of the original move mode and the image sensor move mode,
        the one set of the color image reading elements, which reads the part of the original first, reads the part of the original at the first read target position; and
        the other sets of color image reading elements read the part of the original in a range from a position, which is closer to the second read target position than the first read target position, to the second read target position.

5. The image reader according to claim 4, wherein:
    the image sensor, which is moved by the carriage, is still at an initial waiting position; and
    when the carriage moves the image sensor from the initial waiting position to a position where one of the first read target position and the second read target position is identical with a read position, the carriage moves the image sensor at a higher speed than that when the original is read.

6. The image reader according to claim 3, wherein: the carriage has:
    an original move mode in which the original moves and the carriage and the image sensor are still; and
    an image sensor move mode in which the original is still and the carriage moves the image sensor; and
    the one set of the color image reading elements, which reads the part of the original first for the original move mode, is different from that for the image sensor move mode.

7. The image reader according to claim 1, further comprising:

a data acquisition unit that automatically acquires white level correction data of the plural sets of color image reading elements and white level correction data of the plural sets of monochrome image reading elements, wherein the detection unit is further configured to detect when a user operates an input device.

8. The image reader according to claim 7, wherein after resolution used in reading of the original is selected, the data acquisition unit acquires the white level correction data corresponding to the selected resolution.

9. The image reader according to claim 7, wherein the data acquisition unit acquires plural sets of white level correction data corresponding to all selectable resolutions before one of the selectable resolutions is selected.

10. The image reader according to claim 7, wherein:
the plural sets of color image reading elements are three sets of color image reading elements including:
three sets of photoelectric conversion element arrays, which correspond to different colors, respectively;
three sets of buffers to which the three sets of photoelectric conversion element arrays output data, respectively; and
three channels to which the three sets of buffers output signals, respectively.

11. The image reader according to claim 1, further comprising:
a light source that emits light to the part of the original, which is located at a read position, wherein:
when the light source emits light, the part of the original, which is located at the first read target position, becomes brighter than that located at the second read target position.

12. An image reader comprising:
an image sensor including:
a color image reading device having a first read target position of the image sensor at which the color image reading device reads a part of an original; and
a monochrome image reading device located at a different position than the color image reading device, and having a second read target position of the image sensor at which the monochrome image reading device reads the part of the original different from the first read target position;
a detection unit that detects at least one of:
that the original to be read is present on an automatic document feeder;
that a cover is open, the cover covering an original placement face where the original to be read is placed; and
that the cover is closed;
a carriage that includes the image sensor, the carriage being movable along a sub-scan direction during an image reading operation;
a mode switch unit that switches between a color mode and a monochrome mode; and
a control unit, wherein:
before the control unit accepts a start request by a user, when the mode switch unit switches to the color mode and when the detection unit detects that the original is present on the automatic document feeder, the control unit moves the carriage to a first position;
before the control unit accepts a start request by a user, when the mode switch unit switches to the monochrome mode and when the detection unit detects that the original is present on the automatic document feeder, the control unit moves the carriage to a second position that is located a predetermined distance from the first position along the sub-scan direction;
when the detection unit detects that the cover is open or closed and the mode switch unit switches to the monochrome mode, the control unit moves the carriage to a third position; and
when the detection unit detects that the cover is open or closed and the mode switch unit switches to the color mode, the control unit moves the carriage to a fourth position that is located the predetermined distance from the third position along the sub-scan direction.

13. The image reader according to claim 12, wherein:
when the mode switch unit switches to the color mode, the control unit controls the color image reading device and the carriage to obtain a color image from the original after a user instructs to start reading the original; and
when the mode switch unit switches to the monochrome mode, the control unit controls the monochrome image reading device and the carriage to obtain a monochrome image from the original after the user instructs to start reading the original.

14. The image reader according to claim 1, further comprising:
a light source that is disposed in the carriage.

15. An image reader comprising:
a read head comprising an image sensor comprising a plurality of color image reading elements and at least one monochrome image reading element which is located at a different position on the image sensor than the color image reading elements, the read head being movable along a sub-scan direction;
a detection unit that detects at least one of:
that the original to be read is present on an automatic document feeder;
that a cover is open, the cover covering an original placement face where the original to be read is placed; and
that the cover is closed;
a mode switch unit that switches between a color mode and a monochrome mode; and
a control unit that:
before the control unit accepts a start request by a user, when the mode switch unit switches to the monochrome mode and when the detection unit detects that the original is present on the automatic document feeder, moves the carriage to a first position;
before the control unit accepts a start request by a user, when the mode switch unit switches to the color mode and when the detection unit detects that the original is present on the automatic document feeder, moves the carriage to a second position that is located a predetermined distance from the first position along the sub-scan direction;
when the detection unit detects that the cover is open or closed and the mode switch unit switches to the monochrome mode, moves the carriage to a third position; and
when the detection unit detects that the cover is open or closed and the mode switch unit switches to the color mode, moves the carriage to a fourth position that is located the predetermined distance from the third position along the sub-scan direction.

16. The image reader according to claim 15, wherein the start position of the original is a first start position for an original fed from the automatic document feeder and a second start position for an original placed on a flatbed, the first start position being different from the second start position.

17. The image reader according to claim 16, wherein the control unit checks whether the original is set on the automatic document feeder, and if the control unit determines that the original is set on the automatic document feeder, the control unit sets the start position of the original to the first start position, otherwise the control unit sets the start position of the original to the second start position.

* * * * *